F. M. DAVIS.
FEEDING AND CLAMPING MEANS FOR METAL WORKING MACHINES.
APPLICATION FILED DEC. 31, 1920.
1,415,530.
Patented May 9, 1922.
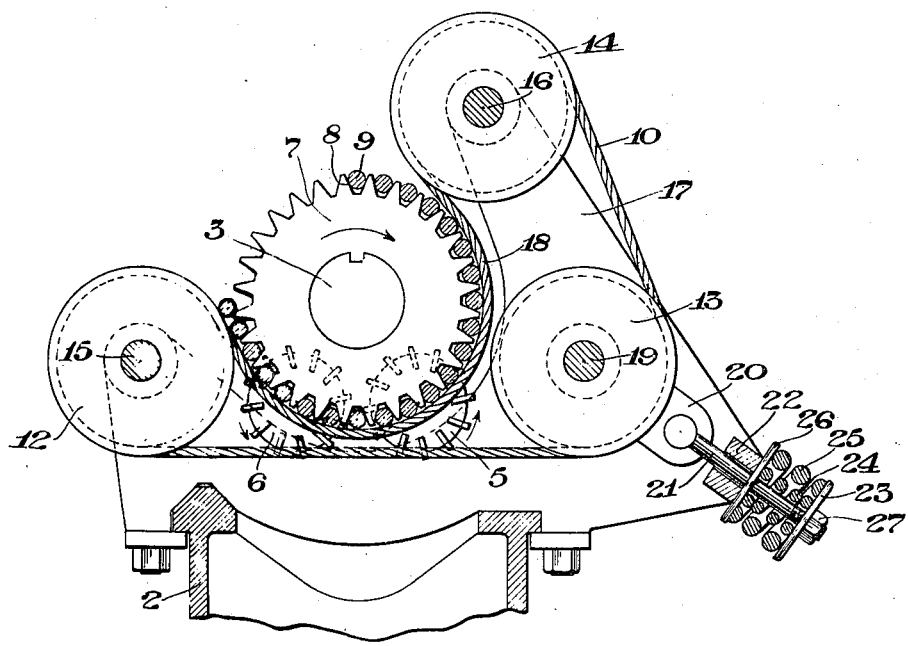
WITNESSES
INVENTOR
Frank M. Davis
By R. S. Caldwell
ATTORNEY

UNITED STATES PATENT OFFICE.

FRANK M. DAVIS, OF MILWAUKEE, WISCONSIN.

FEEDING AND CLAMPING MEANS FOR METAL-WORKING MACHINES.

1,415,530.  Specification of Letters Patent.  Patented May 9, 1922.

Application filed December 31, 1920. Serial No. 434,307.

*To all whom it may concern:*

Be it known that I, FRANK M. DAVIS, a citizen of the United States, and resident of Milwaukee, in the county of Milwaukee and State of Wisconsin, have invented new and useful Improvements in Feeding and Clamping Means for Metal-Working Machines, of which the following is a description, reference being had to the accompanying drawings, which are a part of this specification.

The invention relates to metal-working machines.

The object of the invention is to provide a simple and efficient work-feeding and clamping means for metal-working machines such as milling cutters, metal sawing, cutting and grinding machines whereby the work is quickly fed to the cutting means and removed from the machine.

A further object of this invention is to provide a feeding and clamping means for metal-working machines in which the work is automatically clamped to the work carrier in a vise formed by the carrier and an element travelling with the carrier during the cutting operation.

A further object of this invention is to provide an endless clamping band, such as a cable or chain moving with the work and holding it firmly on the work carrier while the work is being fed to and past the working tools, such as milling cutters.

The invention further consists in the several features hereinafter set forth and more particularly defined by claims at the conclusion hereof.

The drawing shows the mechanism embodying the invention applied to a milling machine.

In the drawing the numeral 2 designates a part of the frame of a milling machine, 3 the rotating work mandrel, 5 a roughing milling cutter and 6 a finishing milling cutter. These parts and their arrangement are illustrative only as the invention is applicable to different forms of metal-working machines.

The work mandrel 3 together with a work-receiving means, such as the member 7, form a work carrier. This member 7 is here shown as provided with jaws 8 to receive the work, such as rods 9, but the work carrier is not to be restricted to this form as it is capable of many modifications and changes to suit it to the work being operated upon. It is to be understood that the invention in its broadest aspect is not to be limited to a rotating carrier.

A clamping band, such as a cable 10, is mounted on guide pulleys 12, 13 and 14. Pulleys 12 and 14 are journalled on shafts 15 and 16, respectively, mounted upon a frame 17, which is shown separate from, though it may be a part of, the frame 2. These pulleys bear such a relation to each other as to permit a loop or bend 18 being formed in the cable where said cable engages the work on the carrier. The pulley 13 is mounted on a shaft 19 connected by a member 20 to a rod 21 passing loosely through a guide 22 on the frame 17 and carrying a plate 23. Tension springs 24 and 25 are interposed between said plate 23 and a plate 26 adjacent the guide 22. The rod 21 carries a nut 27 by which the tension of the springs may be adjusted. Springs 24 and 25 acting upon the pulley 13 serve to tension or tighten the cable 10 against the work and the pressure at which said cable engages the work may be varied by the spring adjustment.

While the mandrel 3 and cutters 5 and 6 are rotating, the operator places the work upon the carrier in advance of where the cable 10 cooperates with the carrier and said carrier then brings the work where the cable 10 holds it to the carrier and in this condition the work is fed past the cutters. After the cutting operation the work is removed by the operator after it is loosened from clamped engagement with the carrier by the cable.

In previous milling machines the capacity of the machine has been limited by the number of pieces that could be fed to the machine, which was actually less than the machine could take care of for its rated speed of cutting. In the present machine the full capacity is realized as the work may be fed to the machine faster than the machine will handle it.

I desire it to be understood that this invention is not to be limited to any specific form or arrangement of parts except in so far as such limitations are specified in the claims.

What I claim as my invention is:

1. In a metal-working machine, the combination of a movable work carrier, a cutting tool, and a band travelling with the work carrier during the cutting operation and held under tension to clamp the work against movement between it and the carrier.

2. In a metal-working machine, the combination of a movable work carrier, a cutting tool, and an endless band travelling with the work carrier during the cutting operation and held under tension to clamp the work against movement between it and the carrier.

3. In a metal-working machine, the combination of a rotating carrier, a cutting tool, and an endless band travelling with the work carrier and held under tension to clamp the work against movement between it and the carrier.

4. In a metal-working machine, the combination of a rotating carrier having work-receiving jaws, a cutting tool, and a cable moving with the carrier during the cutting operation and held under tension to clamp the work against movement in said jaws.

5. In a metal-working machine, the combination of a rotary carrier having work-receiving jaws, a cutting tool, pulleys arranged proximate the carrier with the carrier disposed between a pair of the pulleys, a clamping cable running over said pulleys and engaging the work between the pair of pulleys and securely holding the work against movement in the jaws, and means for tensioning said cable.

6. In a continuous milling machine, the combination of a plurality of pulleys, a clamping cable passing over said pulleys, a work carrier mounted between two of the pulleys and forming a bend in the cable between which and the carrier the work is clamped, means for tensioning said cable, and a milling cutter acting on the work while it is clamped to the carrier.

7. In a metal-working machine, the combination of cable guides, a clamping cable passing over said guides, a work carrier mounted between the guides and forming a bend in the cable between which and the carrier the work is securely clamped against movement, and a cutting tool operating on the work clamped to the carrier.

In testimony whereof, I affix my signature.

FRANK M. DAVIS.